(No Model.) 3 Sheets—Sheet 1.
C. A. PARSONS.
BEARING FOR STEAM TURBINES.
No. 513,367. Patented Jan. 23, 1894.
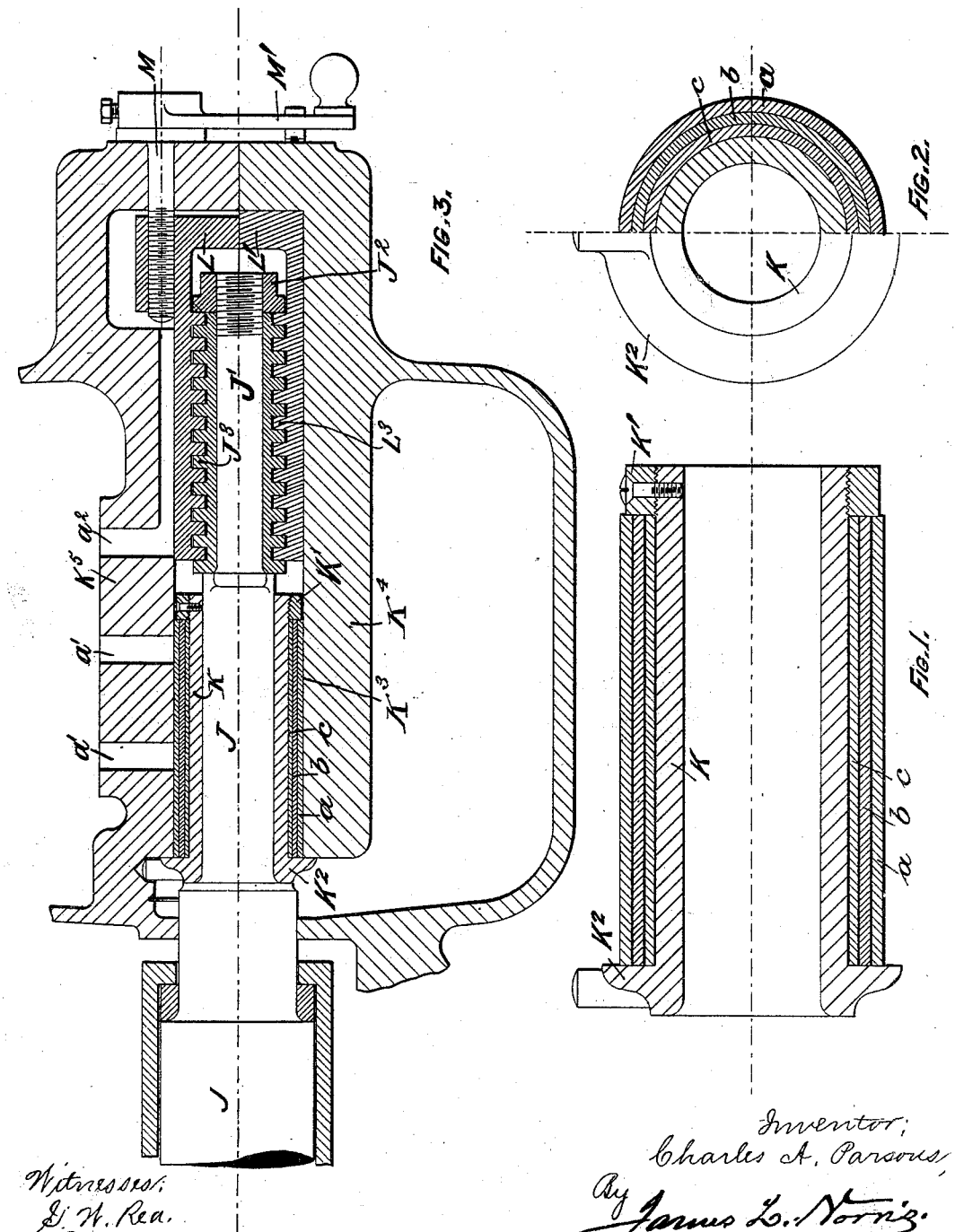

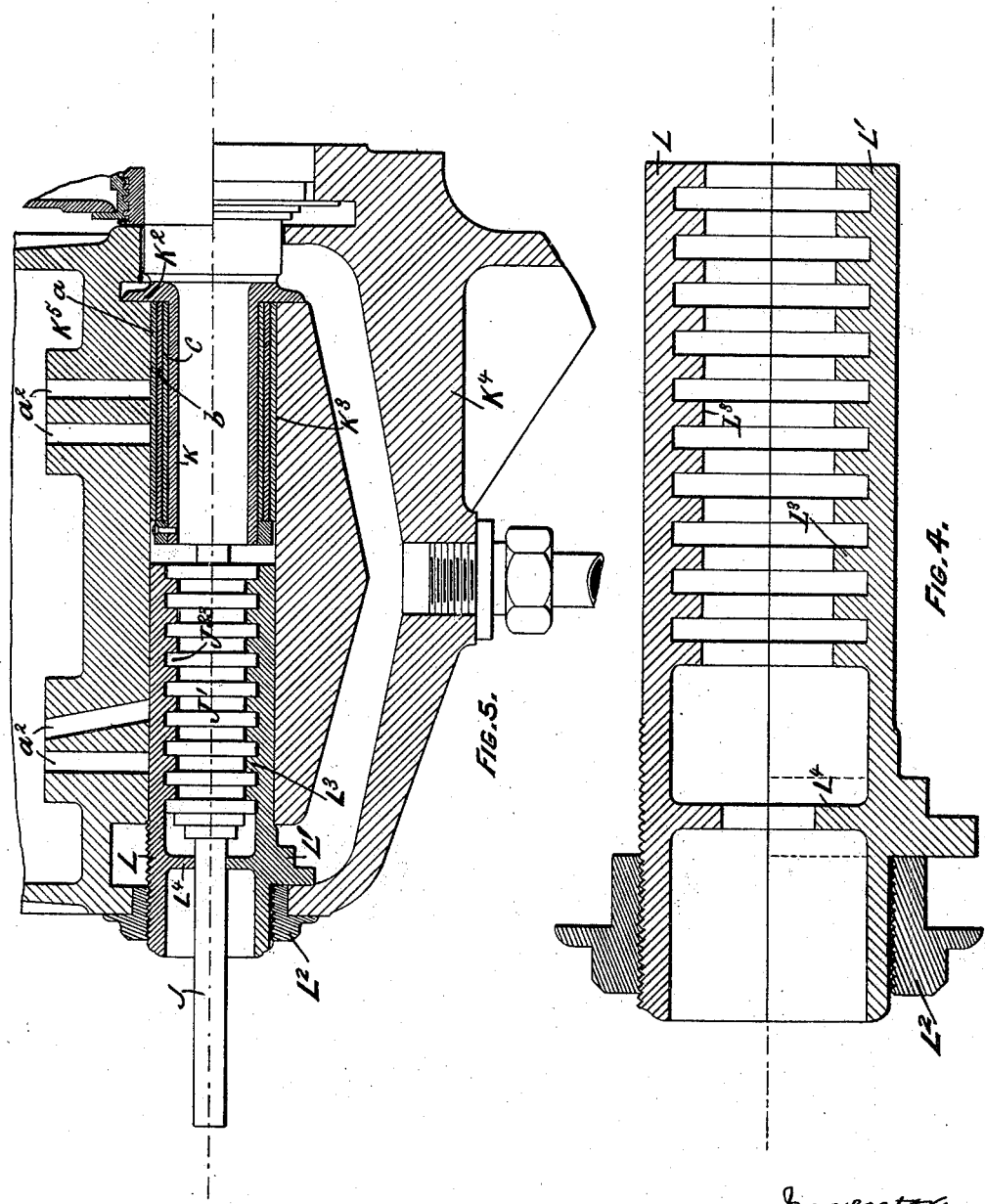

(No Model.) 3 Sheets—Sheet 3.

C. A. PARSONS.
BEARING FOR STEAM TURBINES.

No. 513,367. Patented Jan. 23, 1894.

Witnesses:
G. W. Rea.
J. A. Saul.

Inventor;
Charles A. Parsons
By James L. Norris.
Atty.

UNITED STATES PATENT OFFICE.

CHARLES ALGERNON PARSONS, OF NEWCASTLE-ON-TYNE, ENGLAND.

BEARING FOR STEAM-TURBINES.

SPECIFICATION forming part of Letters Patent No. 513,367, dated January 23, 1894.

Application filed July 27, 1893. Serial No. 481,655. (No model.) Patented in England January 22, 1890, No. 1,120, and September 23, 1890, No. 14,994, and in France November 5, 1890, No. 209,314, and April 23, 1891, No. 212,976.

*To all whom it may concern:*

Be it known that I, CHARLES ALGERNON PARSONS, a subject of the Queen of Great Britain, residing at Newcastle-on-Tyne, in the county of Durham, England, have invented certain new and useful Improvements in Bearings for Steam-Turbines, (for which I have obtained Letters Patent in Great Britain, No. 1,120, dated January 22, 1890, and No. 14,944, dated September 23, 1890, and in France, No. 209,314, dated November 5, 1890, and No. 212,976, dated April 23, 1891;) and I do hereby declare the following to be a full, clear, and exact description of the invention, such as will enable others skilled in the art to which it appertains to make and use the same.

The object of the invention is to produce a more effective arrangement of bushes and bearings for the purpose of lessening or preventing the vibration caused by the high speed of rotation of a steam turbine and to combine with such vibration-arresting-bushes, devices for longitudinally adjusting the turbine spindle and holding it from endwise movement while taking up any end thrust or pull which the turbine may cause.

The invention consists in a number of concentric bushes slipping one into the other with slight freedom of fit and contained in a case well fitted endwise. The casing is filled with oil and the outer bush is securely fixed to the turbine frame. The turbine spindle rotates within the inner bush and any vibrating movement is checked or lessened by the forcing out of oil from between the bushes at their ends and circumferentially around the bushes, so that although a slight movement is possible yet it is resisted in whatever direction the spindle may tend to move. The bushes may be of circular, square, or other cross section, and may be formed of separate plates or segments having liquid films between. Longitudinal vibration or oscillation is prevented by an adjustable thrust block to be hereinafter described.

Figure 9:
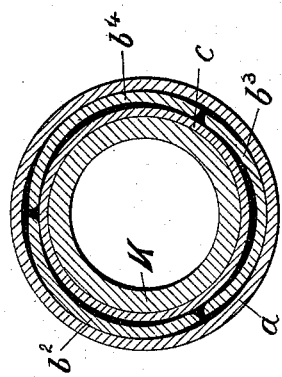
Figure 7:
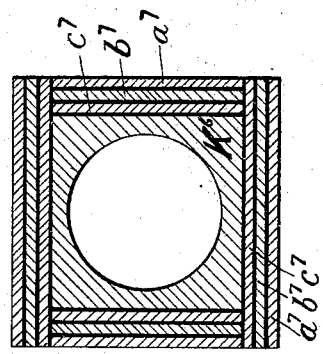
Figure 8:
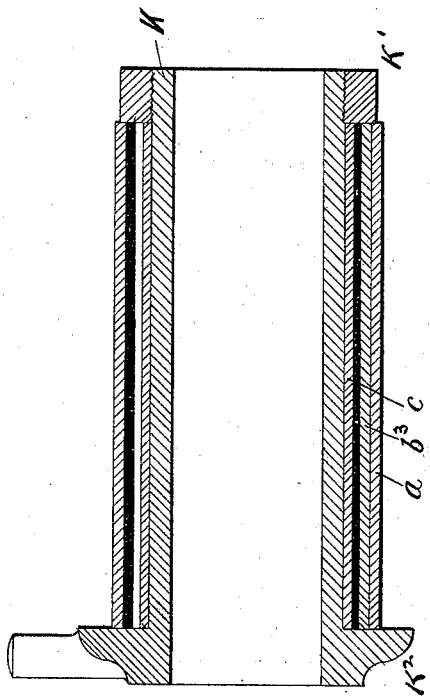
Figure 6:
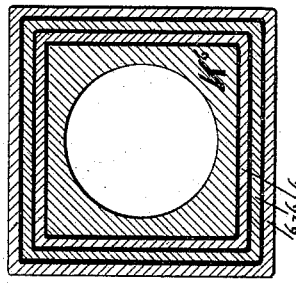

Referring to the two accompanying sheets of drawings, Figure 1 is a longitudinal section through my vibration-arresting-bushes. Fig. 2 is an end view half in elevation and half in section. Fig. 3 is a vertical longitudinal section on a smaller scale, showing the bushes in position carrying a turbine spindle and the thrust block attached. Fig. 4 is a section on a larger scale showing a modification of the thrust block. Fig. 5 is a vertical longitudinal section showing the bushes and modified thrust block in position as in Fig. 3. Fig. 6 is a transverse section through my vibration-arresting-bushes in which the concentric bushes or tubes are square. Fig. 7 is a transverse section, in which the outer bushes consist of metal plates encircling the central square bush. Fig. 8 is a longitudinal section corresponding to Fig. 1, but having one of the concentric bushes in segments. Fig. 9 is a transverse section corresponding to Fig. 8.

Referring to Figs. 1 and 2, the central bush K in which the turbine spindle runs has an annular flange $K^2$ at one end and is surrounded by three concentric bushes or tubes $a$, $b$, $c$, preferably constructed of steel, and turned so as to slip easily over the central bush and each other, that is, with a slight freedom of fit. In practice only a very slight looseness or ease of fit is required. The tubes $a$, $b$, $c$ are held in position by a ring $K'$, and move easily between the annular flange $K^2$ and the ring $K'$. The outer tube $a$ fits into a bored recess $K^3$ in the turbine bed or casing $K^4$.

In Fig. 3 the spindle J J' of the turbine is shown in position. When oil gets access to the tubes $a$, $b$, $c$, which it is allowed to do by means of holes or grooves $a'$ in the upper half $K^5$ of the casing, a slight vibration set up by the spindle J J' causes the tubes $a$, $b$, $c$, to move or shake within each other. But the movement is retarded by the hydraulic and capillary resistance of the oil between the tubes which must be squeezed out from between the tubes $a$, $b$, $c$, and at the ends $K' K^2$. This hydraulic resistance is considerable, so that although some motion is permitted, yet it is resisted powerfully and vibration is avoided. If preferred, square outer bushes or tubes $a^6$ $b^6$ $c^6$ may be arranged concentrically around a square inner bush $K^6$, as shown in transverse section at Fig. 6, or the said bushes may be of any other desired form in cross section. The outer bushes may each be formed of separate plates $a^7$, $b^7$, $c^7$, as shown in Fig. 7.

The essential feature of the invention lies in the liquid resistance offered to the movements of the tubes or bushes relatively to each other by the films of oil or liquid between said tubes or bushes.

At Figs. 8 and 9 I show in longitudinal and transverse section another modification in which the central outer ring or bushing is formed of three segments $b^2 b^3 b^4$, so curved as to act as springs and add a spring resistance to the liquid film or hydraulic resistance. This spring resistance tends to center the spindle. I take up the unbalanced end thrust of the spindle J by means of the thrust-block L, Fig. 3, which is made in two halves provided with internal ring facings $L^3$ slipped over the corresponding ring facings $J^3$ on the portion J' of the spindle J. The thrust-block is constructed in two longitudinal halves L L' and the upper half L slides over the lower half L'. The lower half L' beds firmly to the casing and a screw-nut $L^2$ (Figs. 4 and 5) encircles a projection from both halves, but the lower half is not screw-threaded like the top half, but is plain surfaced to miss the thread of the nut. The upper half is screw-threaded and is held by the nut $L^2$, a flange from which butts against a faced part of the casing. When the nut $L^2$ is screwed up it therefore causes the upper half L of the thrust-block to slide and causes the ring facings of the spindle J to bear hard against the corresponding facings in the lower half L' of the thrust-block. The grooved spindle J and the grooved block L L' therefore permits a longitudinal adjustment, and by easing the grooves or ring facings in the lower half L' the spindle J may be pulled toward the thrust block or tension block, as it really is in this case, and the clearance between the moving and fixed surfaces of the turbine may be varied.

In Fig. 3 the position of the upper half L of the thrust-block is shown as controlled by the screw M and handle M', instead of the nut $L^2$ employed in the construction shown in Fig. 5.

The ring facings $J^3$ on the turbine spindle may be constructed in the form of a sleeve slipped on to the portion J' of the spindle and secured thereon by a nut $J^2$, as shown in Fig. 3, or the said ring facings may be made integral with the spindle as shown at $J^{33}$ in Fig. 5. The thrust block may be provided with an internal annular rib or bearing $L^4$, Figs. 4 and 5, to assist in centering the spindle. Oil is admitted to the thrust-block through an opening or openings $a^2$ in the casing $K^5$, Figs. 3 and 5.

What I claim as my invention is—

1. In a bearing for a turbine spindle, the combination with a central bush, of surrounding concentric bushes, some of which are formed in segments to serve as springs, and a casing provided with means for admitting liquid in which the bushes are immersed, said bushes being fitted easily and having interposed liquid films, whereby a slight lateral movement is permitted for the purpose of arresting vibration of the spindle, substantially as described.

2. In a bearing for a turbine spindle, the combination with a spindle, a central bush and surrounding concentric bushes immersed in liquid and having interposed liquid films, of a longitudinally divided thrust-block provided with means for adjusting one half of said block longitudinally, ring facings on the opposing portions of the thrust-block and spindle, and a casing provided with openings for admitting liquid to the thrust-block and bushings, substantially as described.

3. In a bearing for a turbine spindle, the combination with the spindle J having ring facings $J^3$, and the central bush K encircled by concentric bushes or tubes $a, b, c$, of the longitudinally divided thrust-block L L' provided with internal ring facings $L^3$, means for adjusting one half of said thrust-block, and means for supplying a liquid to the bushes and thrust-block, substantially as shown and described.

In testimony whereof I affix my signature in presence of two witnesses.

CHARLES ALGERNON PARSONS.

In presence of—
   JNO. J. SUTHERLAND,
13 *Falmouth Road, Heaton.*
   ROBERT CRUMP,
*Clerk to Messrs. Dees & Thompson, Solicitors, Newcastle-upon-Tyne.*